United States Patent
Kim et al.

(10) Patent No.: US 11,861,359 B2
(45) Date of Patent: Jan. 2, 2024

(54) STORAGE DEVICE AND METHOD OF OPERATING THE SAME

(71) Applicant: SK hynix Inc., Icheon (KR)

(72) Inventors: Ki Sung Kim, Icheon (KR); Wun Mo Yang, Icheon (KR); Gun Woo Yeon, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/157,677

(22) Filed: Jan. 20, 2023

(65) Prior Publication Data

US 2023/0153103 A1 May 18, 2023

Related U.S. Application Data (63) Continuation of application No. 17/221,588, filed on Apr. 2, 2021, now Pat. No. 11,561,785.

(30) Foreign Application Priority Data

Oct. 6, 2020 (KR) ......................... 10-2020-0128796

(51) Int. Cl.
  *G06F 8/65* (2018.01)
  *G06F 9/4401* (2018.01)
(52) U.S. Cl.
  CPC .............. *G06F 8/65* (2013.01); *G06F 9/4403* (2013.01)
(58) Field of Classification Search
  CPC ....................................................... G06F 8/65
  See application file for complete search history.

(56) References Cited

U.S. PATENT DOCUMENTS

| | | | |
|---|---|---|---|
| 7,506,335 B1* | 3/2009 | Wooff .................... | G06F 9/4416 717/173 |
| 9,268,542 B1* | 2/2016 | Mars ...................... | G06F 9/5016 |
| 10,275,259 B1* | 4/2019 | Jain ........................ | G06F 9/4411 |
| 2005/0223359 A1* | 10/2005 | Rao Nagaraju ....... | G06F 11/362 717/124 |
| 2007/0245333 A1* | 10/2007 | Ferlitsch ................. | G06F 8/65 717/168 |
| 2014/0075169 A1* | 3/2014 | Andrews ................ | G06F 9/4416 713/2 |
| 2015/0161391 A1* | 6/2015 | Johnsen ................. | G06F 21/572 713/2 |
| 2016/0266894 A1* | 9/2016 | Panicker ................. | G06F 8/656 |
| 2016/0301756 A1* | 10/2016 | Dahlstrom ............. | G06F 9/4401 |
| 2017/0003955 A1* | 1/2017 | Noguchi ................. | G06F 8/654 |
| 2017/0249155 A1 | 8/2017 | Sundrani et al. | |
| 2019/0004965 A1* | 1/2019 | Warkentin ........... | G06F 12/1027 |

FOREIGN PATENT DOCUMENTS

| | | |
|---|---|---|
| KR | 20160050707 A | 5/2016 |
| KR | 20170017713 A | 2/2017 |

\* cited by examiner

*Primary Examiner* — Jae U Jeon (57) ABSTRACT

Provided herein may be a storage device including a memory device, and a memory controller including a plurality of cores. The memory controller may load a boot loader image for firmware update running in a memory of a core arbitrarily selected from among the plurality of cores, receive a new firmware image from a host in response to the boot loader image that is executed in the selected core, and update a firmware image stored in a memory of each of the plurality of cores with the new firmware image.

7 Claims, 9 Drawing Sheets

STORAGE DEVICE AND METHOD OF OPERATING THE SAME

CROSS-REFERENCE TO RELATED APPLICATION

The present application is a continuation application of U.S. patent application Ser. No. 17/221,588 filed Apr. 2, 2021, and claims priority under 35 U.S.C. § 119(a) to Korean patent application number 10-2020-0128796, filed on Oct. 6, 2020, in the Korean Intellectual Property Office, the entire disclosure of which is incorporated herein by reference.

BACKGROUND

1. Technical Field

Various embodiments of the present disclosure generally relate to an electronic device, and more particularly, to a storage device and a method of operating the storage device.

2. Related Art

Generally, a storage device is a device which stores data under the control of a host device such as a computer, a smartphone, or the like. The storage device may include a memory device configured to store data, and a memory controller configured to control the memory device. Memory devices are chiefly classified into volatile memory devices and nonvolatile memory devices.

A volatile memory device is a memory device, which stores data only when power is supplied thereto and in which data stored therein is lost when power is turned off. Examples of the volatile memory device include a static random access memory (SRAM), a dynamic random access memory (DRAM), and the like.

A nonvolatile memory device is a memory device in which data stored therein is maintained even when power is turned off. Examples of the nonvolatile memory device include a read-only memory (ROM), a programmable ROM (PROM), an electrically programmable ROM (EPROM), an electrically erasable programmable ROM (EEPROM), a flash memory, and the like.

SUMMARY

Various embodiments of the present disclosure are directed to a storage device having improved firmware update performance, and a method of operating the storage device.

A memory controller in accordance with an embodiment of the present disclosure may include a processor including a plurality of cores, and a buffer memory. The buffer memory may store a boot loader image for firmware update running. The processor may load, from the buffer memory, the boot loader image in a memory of a core arbitrarily selected from among the plurality of cores, receive a new firmware image from a host in response to the boot loader image that is executed in the selected core, and update a firmware image stored in a memory of each of the plurality of cores with the new firmware image.

A method of operating a memory controller including a plurality of cores and a buffer memory and configured to control a memory device in accordance with an embodiment of the present disclosure may include: loading a boot loader image, which is stored in the buffer memory and provided for firmware update running in a memory of a core arbitrarily selected from among the plurality of cores; receiving a new firmware image from a host in response to the boot loader image executed in the selected core; and updating a firmware image stored in a memory of each of the plurality of cores with the new firmware image.

A storage device in accordance with an embodiment of the present disclosure may include: a memory device; and a memory controller including a plurality of cores. The memory controller may load a boot loader image for firmware update running in a memory of a core arbitrarily selected from among the plurality of cores, receive a new firmware image from a host in response to the boot loader image that is executed in the selected core, and update a firmware image stored in a memory of each of the plurality of cores with the new firmware image.

DETAILED DESCRIPTION

Specific structural or functional descriptions in the embodiments of the present disclosure introduced in this specification or application are only for description of the embodiments of the present disclosure. The descriptions should not be construed as being limited to the embodiments described in the specification or application.

Figure 1:
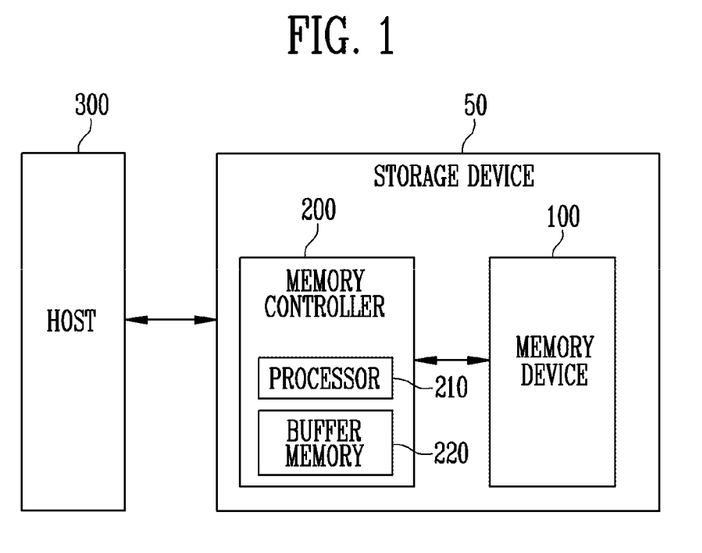
FIG. 1 is a diagram illustrating a storage device in accordance with an embodiment of the present disclosure.

FIG. 1 is a diagram illustrating a storage device 50 in accordance with an embodiment of the present disclosure.

Referring to FIG. 1, the storage device 50 may include a memory device 100 and a memory controller 200 configured to control an operation of the memory device 100. The storage device 50 may be a device configured to store data under the control of a host 300 such as a cellular phone, a smartphone, an MP3 player, a laptop computer, a desktop computer, a game machine, a TV, a tablet PC, an in-vehicle infotainment system, or the like.

The storage device 50 may be manufactured as any one of various kinds of storage devices depending on a host interface, which is a communication system for communicating with the host 300. For example, the data storage device 50 may be configured of any one of various kinds of storage devices such as an SSD, an MMC, an eMMC, an RS-MMC, a micro-MMC type multimedia card, an SD, a mini-SD, a micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, a memory stick, and so on. The storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, a wafer-level stack package (WSP) type, and so on.

The memory device 100 may store data therein. The memory device 100 may operate under the control of the memory controller 200. The memory device 100 may include a memory cell array including a plurality of memory cells configured to store data therein.

The memory cells may include a single level cell (SLC) capable of storing a single-bit data, a multi-level cell (MLC) capable of storing two-bit data, a triple-level cell (TLC) capable of storing three-bit data, or a quad-level cell (QLC) capable of storing four-bit data.

The memory cell array may include a plurality of memory blocks. Each memory block may include a plurality of memory cells. Each memory block may include a plurality of pages. In an embodiment, a page may be a unit of storing data in the memory device 100 or reading stored data from the memory device 100.

A memory block may be a unit of erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory device, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In this specification, for the sake of explanation, it is assumed that the memory device 100 is a NAND flash memory.

The memory device 100 may receive a command and an address from the memory controller 200 and access an area of the memory cell array that is selected by the address. In other words, the memory device 100 may perform an operation instructed by the command on the area selected by the address. For example, the memory device 100 may perform a write (or program) operation, a read operation, and an erase operation. During the program operation, the memory device 100 may program data to the area selected by the address. During the read operation, the memory device 100 may read data from the area selected by the address. During the erase operation, the memory device 100 may erase data from the area selected by the address.

The memory controller 200 may control overall operations of the storage device 50. When power is applied to the storage device 50, the memory controller 200 may execute firmware (FW). In the case where the memory device 100 is a flash memory device, the memory controller 200 may execute firmware such as a flash translation layer (FTL) for controlling communication between the host 300 and the memory device 100.

In an embodiment, the memory controller 200 may receive data and a logical block address (LBA) from the host 300, and translate the LBA into a physical block address (PBA) indicating addresses of memory cells to which the data is to be stored, the memory cells being included in the memory device 100.

The memory controller 200 may control the memory device 100 to perform a program operation, a read operation, or an erase operation in response to a request from the host 300. During the program operation, the memory controller 200 may provide a write command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may autonomously generate a command, an address, and data regardless of a request from the host 300, and transmit them to the memory device 100. For example, the memory controller 200 may provide a command, an address, and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 according to an interleaving scheme so as to enhance the operating performance. The interleaving scheme may be an operating scheme of overlapping operating periods of at least two or more memory devices 100.

In an embodiment, the memory controller 200 may include a processor 210 and a buffer memory 220. The processor 210 may include a plurality of cores. Each core may store a firmware image for an operation of the storage device 50. Each core may execute the stored firmware and thus control overall operations of the storage device 50.

The memory controller 200 may load a boot loader image from the buffer memory 220 in a memory of an arbitrarily selected core of the plurality of cores. The memory controller 200 may dynamically allocate, in the memory of the selected core, an address of a target memory area in which the boot loader image is to be loaded. The memory controller 200 may execute the boot loader image loaded in the target memory area. The memory controller 200 may receive a new firmware image from the host 300 in response to the executed boot loader image. The memory controller 200 may update a firmware image stored in a memory of each of the plurality of cores with the new firmware image. In an embodiment, the memory controller 200 may update the firmware image stored in the memory of each of the plurality of cores with the new firmware image, in parallel with processing a request received from the host 300.

The memory controller 200 may control the memory device 100 so that the memory device 100 stores therein the updated firmware image stored in the memory of each of the plurality of cores before power-off.

The buffer memory 220 may store the boot loader image for firmware update running. In an embodiment, the buffer memory 220 may be formed of a volatile memory device. In this case, after power-on, the boot loader image stored in the memory device 100 may be loaded in the buffer memory 220. In another embodiment, the buffer memory 220 may be formed of a nonvolatile memory device. In this case, loading the boot loader image from the memory device 100 may be omitted.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
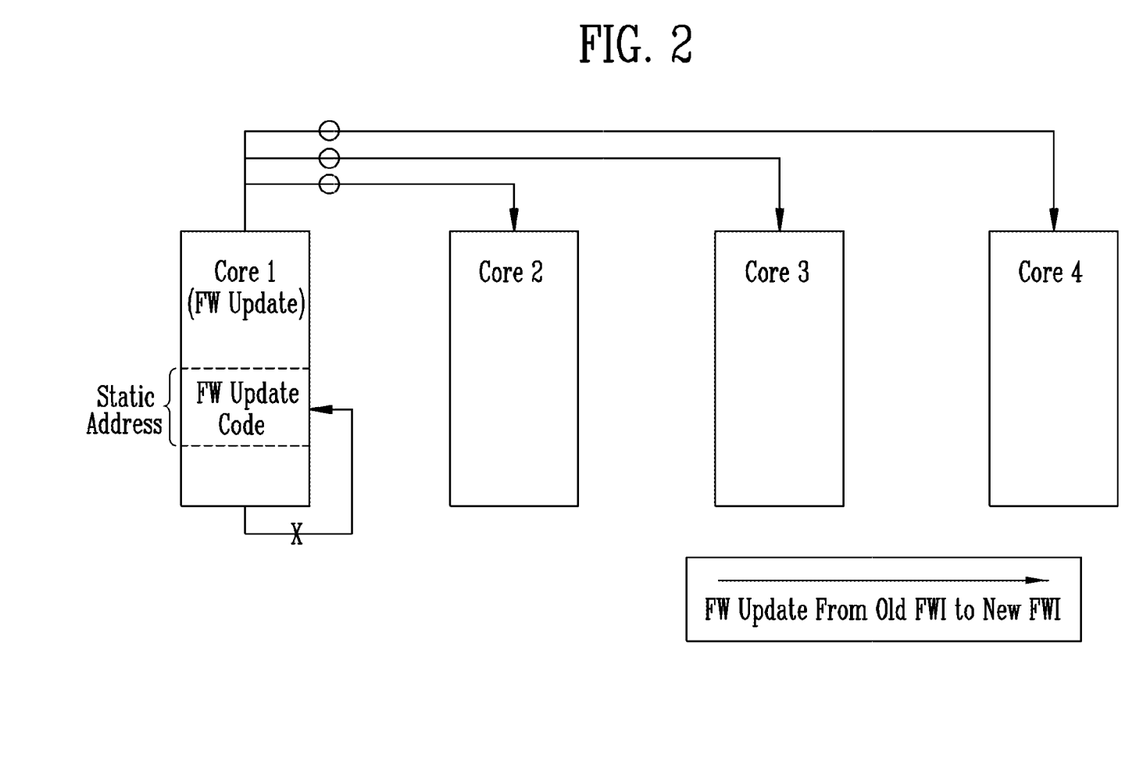
FIG. 2 is a diagram for describing a configuration and operation of a processor of FIG. 1 in accordance with an embodiment.

FIG. 2 is a diagram for describing a configuration and operation of the processor 210 of FIG. 1 in accordance with an embodiment.

Referring to FIG. 2, the processor 210 may include a plurality of cores Core 1 to Core 4. The number of cores included in the processor 210 is not limited to that of the present embodiment.

The first core Core 1 may be a processor dedicated for the firmware update running. A firmware image to be loaded in a memory of the first core Core1 may include a firmware update code for the firmware update running. The firmware image including the firmware update code, e.g., a main firmware image, may be loaded in a memory area corresponding to a static address in the memory of the first core Core 1.

The first core Core 1 may update, in response to an executed firmware update code, a firmware image stored in a memory of the other cores Core 2 to Core 4 with a new firmware image received from the host 300.

During the firmware update running, the main firmware image stored in the memory of the first core Core 1 may not be updated because the firmware update code included in the main firmware image is executed. In other words, since the first core Core 1 communicates with the host 300 in response to the executed firmware update code, the firmware image update cannot be performed on the first core Core 1 while the communication with the host 300 is performed.

Before power-off, the new firmware image updated in the memory of the other cores Core 2 to Core 4 may be stored in the memory device 100. Thereafter, the new firmware image stored in the memory device 100 is loaded in the memory of the first core Core 1 after power-on, so that the main firmware image corresponding to the first core Core 1 may be updated.

In other words, the main firmware image stored in the memory of the first core Core 1 may be updated through a power-off or power-on process after the communication with the host 300 has been completed.

Figure 3:
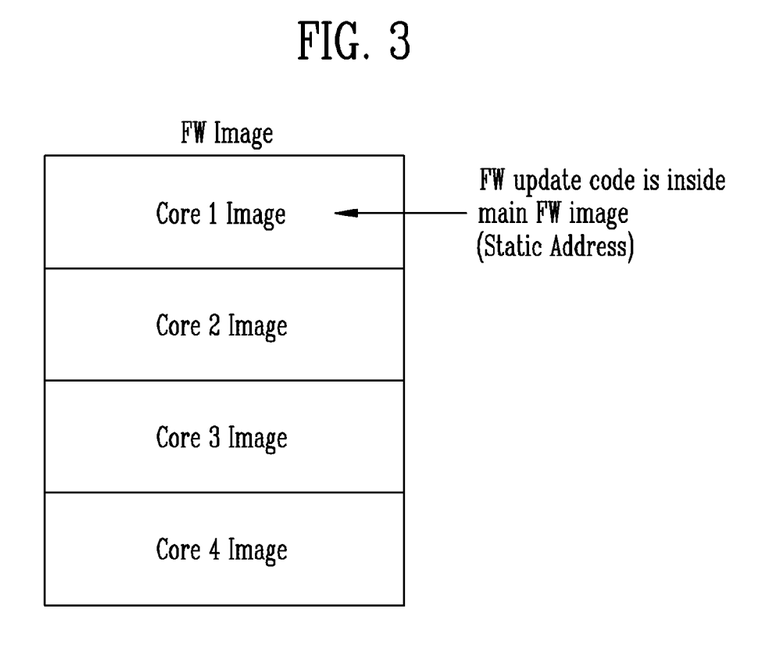
FIG. 3 is a diagram for describing a firmware image of FIG. 2.

FIG. 3 is a diagram for describing the firmware image of FIG. 2.

Referring to FIG. 3, a memory of each core of the processor 210 may store a corresponding firmware image.

Here, the firmware update code for the firmware update running may be included in the main firmware image corresponding to the first core Core 1 that is dedicated for the firmware update. The firmware update code may be stored in a memory area corresponding to a static address in the memory of the first core Core 1.

Figure 4:
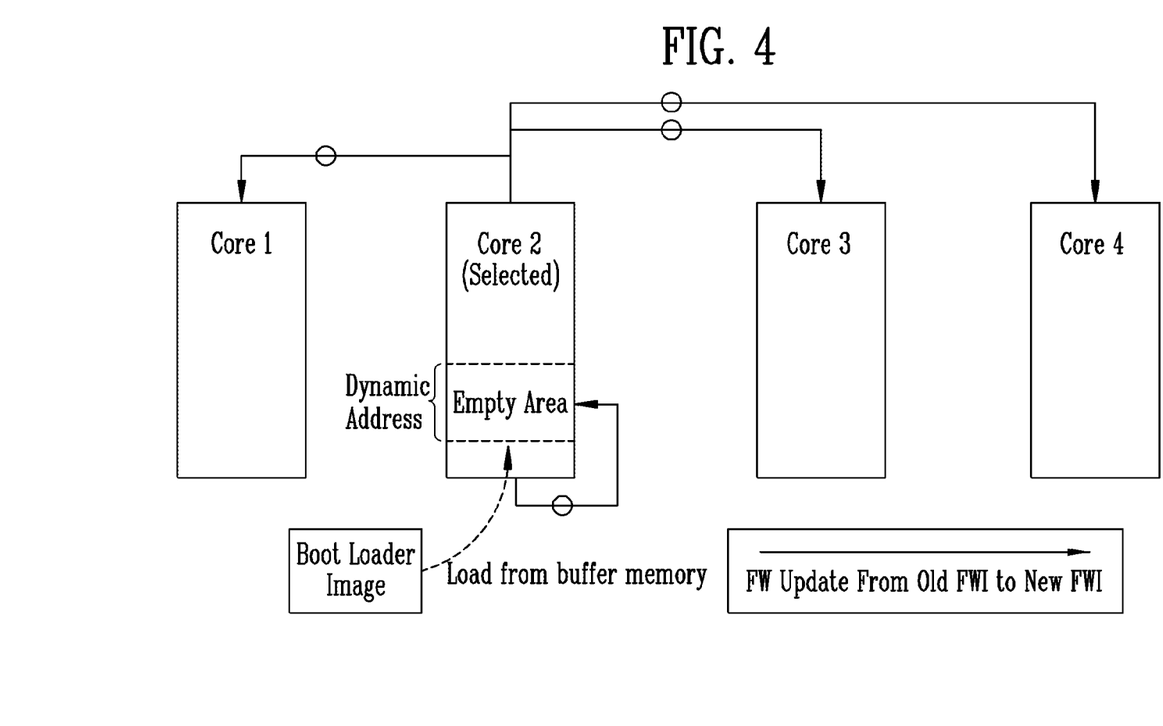
FIG. 4 is a diagram for describing a configuration and operation of a processor of FIG. 1 in accordance with an embodiment.

FIG. 4 is a diagram for describing a configuration and operation of the processor 210 of FIG. 1 in accordance with an embodiment.

Referring to FIG. 4, the processor 210 may include a plurality of cores Core 1 to Core 4. The number of cores included in the processor 210 is not limited to that of the present embodiment.

In FIG. 4, a separate processor dedicated for the firmware update running may not be present. Therefore, any one core of the plurality of cores Core 1 to Core 4 may be selected for the firmware update running.

The firmware update code may be generated as a boot loader image. The generated boot loader image may be stored in the buffer memory 220. The boot loader image for the firmware update running may be loaded from the buffer memory 220 in a memory of an arbitrarily selected core of the plurality of cores Core 1 to Core 4. In an embodiment, the boot loader image may be generated as a binary code.

The selected core may dynamically allocate a target memory area in which the boot loader image is to be loaded among memory areas of the selected core. The target memory area may be an empty area in which data is not stored. Therefore, an address of the target memory area may be variable.

Referring to FIG. 4, the selected core may be the second core Core 2. The second core Core 2 may execute the boot loader image loaded in the target memory area therein. The second core Core 2 may receive a new firmware image from the host 300 in response to the executed boot loader image. The second core Core 2 may update, in response to the executed boot loader image, a firmware image stored in a memory of each of the other cores Core 1, Core3, and Core 4 with the new firmware image.

The firmware image stored in the memory of the second core Core2 may also be updated with the new firmware image. The reason for this is because the boot loader image has been loaded in the target memory area that is an empty area regardless of an area of the memory of the second core Core 2 in which the firmware image is loaded. Therefore, even while the boot loader image is executed, the firmware image stored in the other area than the target memory area in the memory of the second core Core 2 may be updated with the new firmware image.

In other words, the second core Core 2 may perform communication with the host 300 in response to the executed boot loader image code loaded in the target memory area, but this operation is performed regardless of running the firmware image stored in the other area of the second core Core 2, so that the second core Core 2 may update the firmware image stored therein while performing the communication with the host 300. In other words, the second core Core 2 may perform an operation of updating the firmware image stored in the memory of each of the plurality of cores Core 1 to Core 4, in parallel with processing a request received from the host 300.

Before power-off, the new firmware image updated in the memory of each core may be stored in the memory device 100.

Figure 5:
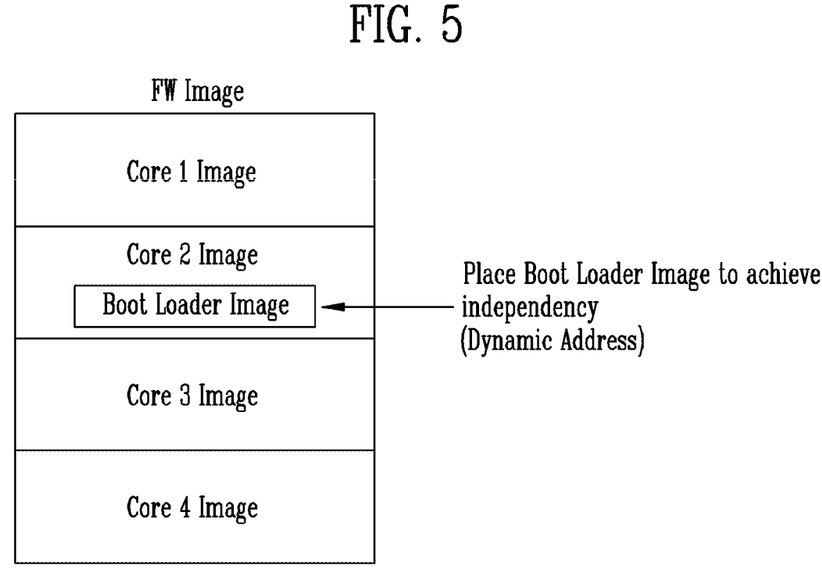
FIG. 5 is a diagram for describing a firmware image of FIG. 4.

FIG. 5 is a diagram for describing the firmware image of FIG. 4.

Referring to FIG. 5, a memory of each core may store a corresponding firmware image.

Here, the boot loader image for the firmware update running may be separately generated rather than being included in a specific firmware image. The boot loader image may be loaded in a memory of an arbitrarily selected core among the plurality of cores Core 1 to Core 4.

In an embodiment of FIG. 5, in the memory of the arbitrarily selected core, e.g., the second core Core 2, the boot load image may be loaded in a target memory area that is an empty memory area, in response to a dynamically allocated address, i.e., a dynamic address.

Figure 6:
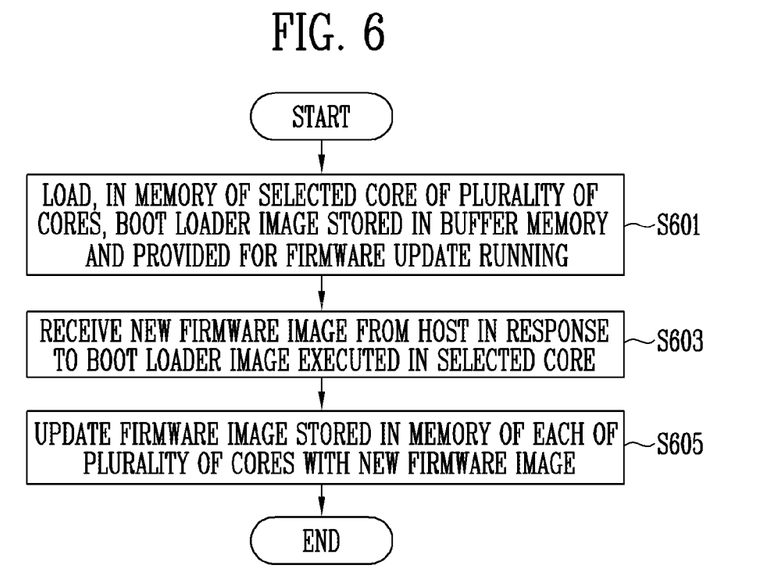
FIG. 6 is a flowchart for describing an operation of a memory controller in accordance with an embodiment of the present disclosure.

FIG. 6 is a flowchart for describing an operation of the memory controller 200 of FIG. 1 in accordance with an embodiment of the present disclosure.

Referring to FIG. 6, at S601, the memory controller 200 may load, in a memory of a selected core of a plurality of cores in the processor 210, a boot loader image from the buffer memory 220, the boot loader image being provided for firmware update running and stored in the buffer memory 220. The boot loader image loaded in the memory of the selected core is stored in an empty target memory area in the memory of the selected core, rather than being included in a firmware image of the selected core.

At S603, the memory controller 200 may receive a new firmware image from the host 300 in response to the boot loader image that is executed in the selected core.

At S605, the memory controller 200 may update a firmware image stored in a memory of each of the plurality of cores with the new firmware image.

Figure 7:
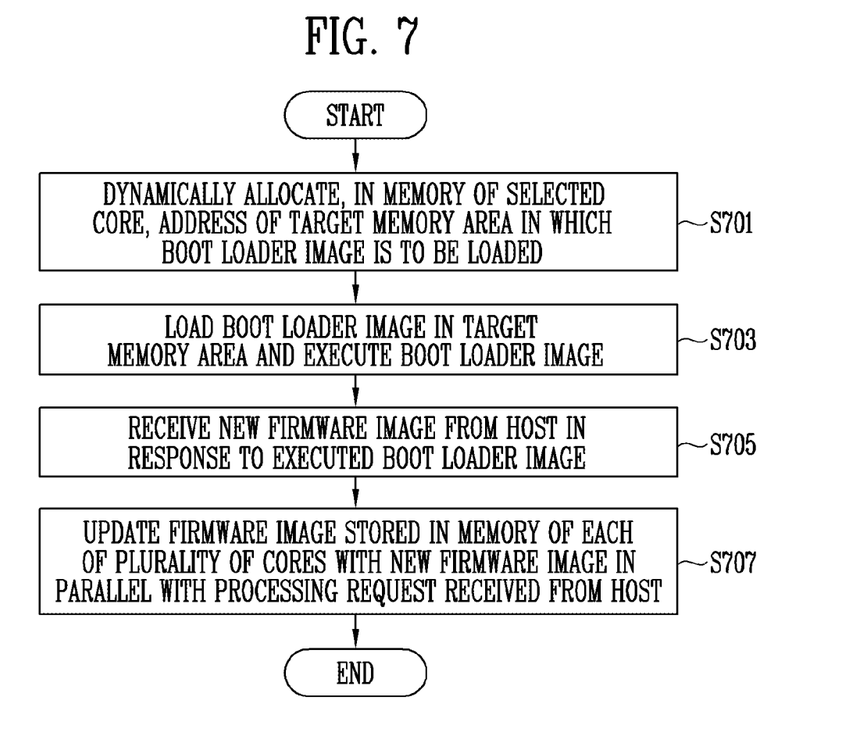
FIG. 7 is a flowchart for describing a method of FIG. 6.

FIG. 7 is a flowchart for describing in detail the method of FIG. 6.

Referring to FIG. 7, at S701, the memory controller 200 may dynamically allocate, in the memory of the selected core, an address of the target memory area in which the boot loader image is to be loaded.

At S703, the memory controller 200 may load the boot loader image in the target memory area and then execute the boot loader image.

At S705, the memory controller 200 may receive a new firmware image from the host 300 in response to the boot loader image that is executed.

At S707, the memory controller 200 may update the firmware image stored in the memory of each of the plurality of cores with the new firmware image, in parallel with processing the request received from the host 300.

Figure 8:
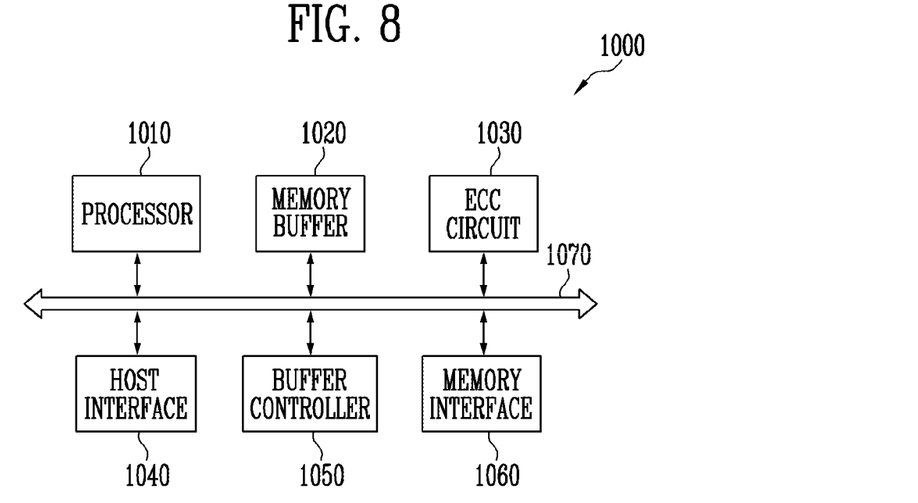
FIG. 8 is a diagram illustrating a memory controller of FIG. 1 in accordance with an embodiment of the present disclosure.

FIG. 8 is a diagram illustrating a memory controller 1000 in accordance with an embodiment. The memory controller 1000 of FIG. 8 may correspond to the memory controller 200 of FIG. 1.

Referring to FIG. 8, the memory controller 1000 is coupled to a host, e.g., the host 300 of FIG. 1, and a memory device, e.g., the memory device 100 of FIG. 1. In response to a request from the host 300, the memory controller 1000 may access the memory device 100. For example, the memory controller 1000 may control a write operation, a read operation, an erase operation, and a background operation of the memory device 100. The memory controller 1000 may provide an interface between the memory device 100 and the host 300. The memory controller 1000 may drive firmware for controlling the memory device 100.

The memory controller 1000 may include a processor 1010, a memory buffer 1020, an error correction code (ECC) circuit 1030, a host Interface 1040, a buffer controller 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the host 300 through the host interface 1040, and communicate with the memory device 100 through the memory interface 1060. In addition, the processor 1010 may communicate with the memory buffer 1020 through the buffer controller 1050. The processor 1010 may control an operation of a storage device, e.g., the storage device 50 of FIG. 1, by using the memory buffer 1020 as an operating memory, a cache memory, or a buffer memory.

The processor 1010 may perform the function of a flash translation layer (FTL). The processor 1010 may translate a logical block address (LBA), provided by the host 300, into a physical block address (PBA) through the FTL. The FTL may receive the LBA and translate the LBA into the PBA using a mapping table. An address mapping method using the FTL may be modified in various ways depending on a unit of mapping. Representative address mapping methods may include a page mapping method, a block mapping method, and a hybrid mapping method.

The processor 1010 may randomize data received from the host 300. For example, the processor 1010 may use a randomizing seed to randomize the data received from the host 300. Randomized data may be provided to the memory device 100 as data to be stored, and may be programmed to a memory cell array of the memory device 100.

During a read operation, the processor 1010 may derandomize data received from the memory device 100. For example, the processor 1010 may use a derandomizing seed to derandomize the data received from the memory device 100. Derandomized data may be output to the host 300.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host 300 under the control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer controller 1050 may control the memory buffer 1020 under the control of the processor 1010.

The memory interface 1060 may communicate with the memory device 100 under the control of the processor 1010. The memory interface 1060 may communicate a command, an address, and data with the memory device 100 through a channel.

In another embodiment, the memory controller 1000 may include neither the memory buffer 1020 nor the buffer controller 1050 therein.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device 100 through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the host interface 1040, the buffer controller 1050, the ECC circuit 1030, and the memory interface 1060. The control bus may be coupled to the host interface 1040, the processor 1010, the buffer controller 1050, the memory buffer 1020, and the memory interface 1060.

In an embodiment, the processor 210 of FIG. 1 may be included in the processor 1010. The buffer memory 220 of FIG. 1 may be included in the memory buffer 1020.

Figure 9:
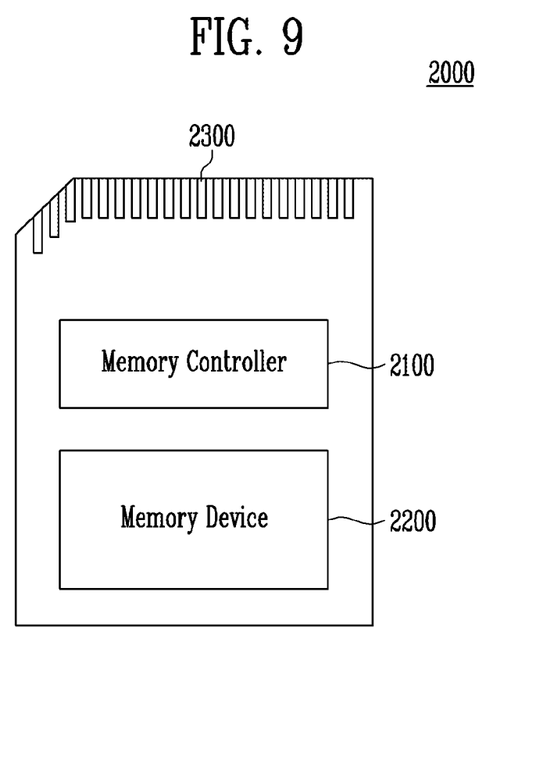
FIG. 9 is a block diagram illustrating a memory card system to which a storage device in accordance with an embodiment of the present disclosure is applied.

FIG. 9 is a block diagram illustrating a memory card system 2000 to which the storage device in accordance with the embodiment of the present disclosure is applied.

Referring FIG. 9, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2200 and a host. The memory controller 2100 may drive firmware for controlling the memory device 2200. The memory controller 2100 may be embodied in the same manner as that of the memory controller 200 described with reference to FIG. 1.

In an embodiment, the memory controller 2100 may include components such as one or more of a random access memory (RAM), a processing unit, a host interface, a memory interface, and an ECC circuit.

The memory controller 2100 may communicate with an external device (e.g., the host) through the connector 2300. The memory controller 2100 may communicate with the external device based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

In an embodiment, the memory controller 2100 and the memory device 2200 may be integrated into a single semiconductor device to form a memory card such as a personal computer memory card international association (PCM-CIA), a compact flash (CF) card, a smart media card (SM or SMC), a memory stick, a multimedia card (MMC, RS-MMC, or MMCmicro), a SD card (SD, miniSD, microSD, or SDHC), or a universal flash storage (UFS).

Figure 10:
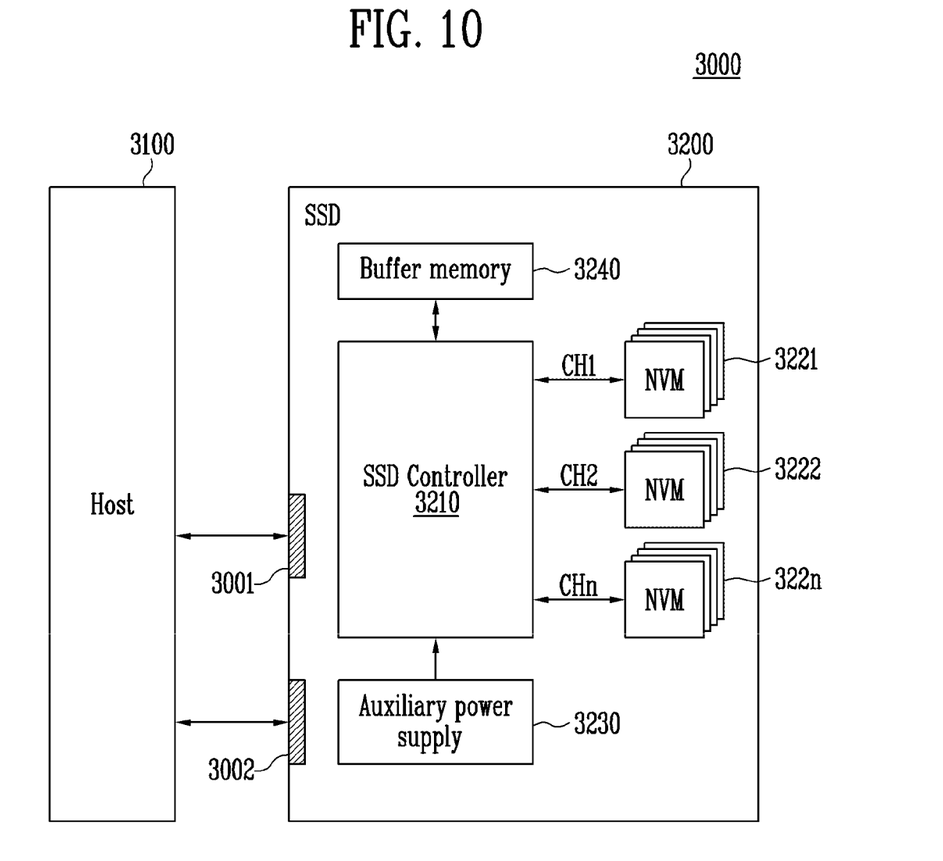
FIG. 10 is a block diagram illustrating a solid state drive (SSD) system to which a storage device in accordance with an embodiment of the present disclosure is applied.

FIG. 10 is a block diagram illustrating a solid state drive (SSD) system 3000 to which the storage device in accordance with the embodiment of the present disclosure is applied.

Referring to FIG. 10, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of nonvolatile memories (NVMs) 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of NVMs 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power to the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of NVMs 3221 to 322n, or may temporarily store metadata (e.g., a mapping table) of the plurality of NVMs 3221 to 322n. The buffer memory 3240 may include any of volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 11:
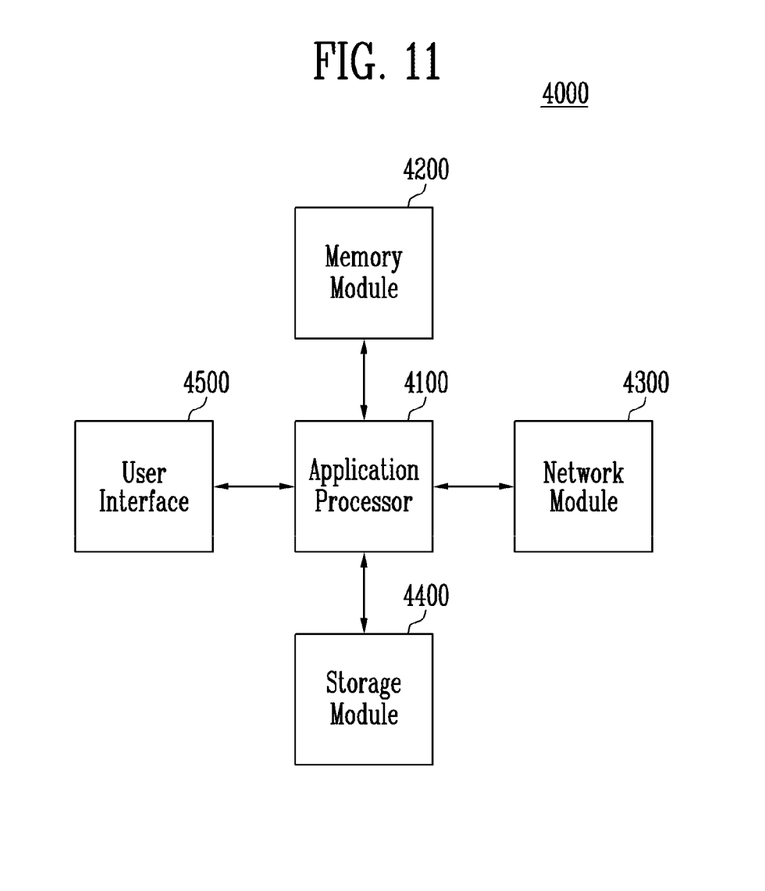
FIG. 11 is a block diagram illustrating a user system to which a storage device in accordance with an embodiment of the present disclosure is applied.

FIG. 11 is a block diagram illustrating a user system 4000 to which the storage device in accordance with the embodiment of the present disclosure is applied.

Referring to FIG. 11, the user system 4000 may include an application processor 4100, a memory module 4200, a network module 4300, a storage module 4400, and a user interface 4500.

The application processor 4100 may run the components included in the user system 4000, an operating system (OS), or a user program. In an embodiment, the application processor 4100 may include one or more of controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile memory such as a DRAM, an SDRAM, a DDR SDRAM, a DDR2 SDRAM, a DDR3 SDRAM, an LPDDR SDARM, an LPDDR2 SDRAM, or an LPDDR3 SDRAM, or a nonvolatile memory such as a PRAM, a ReRAM, an MRAM, or an FRAM. In an embodiment, the application processor 4100 and the memory module 4200 may be packaged based on package-on-package (POP), and then provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile memory such as a phase-change RAM (PRAM), a magnetic RAM (MRAM), a resistive RAM (RRAM), a NAND flash memory, a NOR flash memory, a NAND flash memory having a three-dimensional (3D) structure, or the like. In an embodiment, the storage module 4400 may be provided as a removable storage medium (i.e., a removable drive) such as a memory card or an external drive of the user system 4000.

In an embodiment, the storage module 4400 may include a plurality of nonvolatile memory devices, and each of the plurality of nonvolatile memory devices may operate in the same manner as that of the memory device 100 described above with reference to FIG. 1. The storage module 4400 may operate in the same manner as that of the storage device 50 described above with reference to FIG. 1.

The user interface 4500 may include one or more interfaces for inputting data or instructions to the application processor 4100 or outputting data to an external device. In an embodiment, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric device, and so on. The user interface 4500 may further include one or more of user output interfaces such as an a liquid crystal display (LCD), an organic light emitting Diode (OLED) display device, an active matrix OLED (AMOLED) display device, an LED, a speaker, a monitor, and so on.

As described above, various embodiments of the present disclosure may provide a storage device having improved firmware update performance, and a method of operating the storage device.

Examples of embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of operating a memory controller including a plurality of cores and a buffer memory, the method comprising:
   suspending an execution of running code in a core arbitrarily selected from among the plurality of cores;
   allocating an target address different from an address where the running code is stored in a memory of the selected core;
   loading a boot loader image for firmware update from the buffer memory into the target address;
   receiving a new firmware image from a host in response to the boot loader image executed in the selected core; and
   updating a firmware image stored in a memory of each of the plurality of cores with the new firmware image.

2. The method according to claim 1, the method further comprises resuming the execution of the running code after the updating the firmware image is finished.

3. The method according to claim 1, the method further comprises processing a request received from the host in parallel with the updating the firmware image.

4. A method of operating a memory controller including a plurality of cores and a buffer memory, the method comprising:
   loading a boot loader image, which is stored in the buffer memory and provided for firmware update running, in a memory of a core arbitrarily selected from among the plurality of cores;
   receiving a new firmware image from a host in response to the boot loader image executed in the selected core;
   updating a firmware image stored in a memory of each of the plurality of cores with the new firmware image; and
   providing a response to the host in response to a request for update check from the host.

5. The method according to claim 4, wherein the providing the response to the host comprising:
   checking a status of the memory controller or log information on the memory controller; and
   providing the response including a version of firmware image that is updated to the plurality of cores to the host based on a check result after the updating the firmware image is finished.

6. A method of operating a memory controller including a core and a buffer memory, the method comprising:
   loading a boot loader image stored in the buffer memory into a first address of a memory of the core;
   receiving a first firmware image from a host in response to the boot loader image executed in the core;

updating a previous firmware image stored in the memory of the core with the first firmware image;

loading the boot loader image stored in the buffer memory into a second address of the memory of the core after the updating the previous firmware is finished;

receiving a second firmware image from the host in response to the boot loader image executed in the core; and updating the first firmware image stored in the memory of the core with the second firmware image, wherein the first address is different from the second address.

7. The method according to claim 6, wherein the first firmware image has a different size from the second firmware image.

* * * * *